Jan. 27, 1959

J. M. WALLACE 2,871,414

POLYPHASE CIRCUIT INTERRUPTER

Filed Feb. 2, 1953

INVENTOR
James M. Wallace.
BY
Ralph H. Swingle
ATTORNEY

Jan. 27, 1959   J. M. WALLACE   2,871,414
POLYPHASE CIRCUIT INTERRUPTER
Filed Feb. 2, 1953   4 Sheets-Sheet 2

INVENTOR
James M. Wallace.
BY
Ralph H. Swingle
ATTORNEY

Jan. 27, 1959

J. M. WALLACE 2,871,414

POLYPHASE CIRCUIT INTERRUPTER

Filed Feb. 2, 1953

WITNESSES:
E. A. McCloskey
G. V. Giolma

INVENTOR
James M. Wallace.
BY
Ralph H. Swingle
ATTORNEY

# United States Patent Office 2,871,414
Patented Jan. 27, 1959

2,871,414

POLYPHASE CIRCUIT INTERRUPTER

James M. Wallace, Montclair, N. J., assignor to Westinghouse Electric Corporation, East Pittsburgh, Pa., a corporation of Pennsylvania Application February 2, 1953, Serial No. 334,686

13 Claims. (Cl. 317—22)

My invention relates generally to circuit interrupters and it has reference in particular to polyphase reclosing circuit breakers.

Generally stated, it is an object of my invention to provide a three-phase reclosing circuit breaker which is adapted for ground-fault protection.

More specifically, it is an object of my invention to provide in a ground-fault protection system for using a three-phase recloser with an overcurrent relay for detecting ground-fault currents in conjunction with an auxiliary switch which is responsive to lockout operation of the recloser on repeated operations to prevent further reclosing.

Another object of my invention is to provide in a three-phase electrically-operated recloser for mounting a fault-responsive relay on the recloser for tripping and reclosing the recloser in response to ground-fault currents which are below the normal tripping current of the recloser, and using a switch actuated by the integrator of the recloser for interrupting the reclosing circuit when the recloser has reclosed a predetermined number of times.

Yet another object of my invention is to provide in a reclosing circuit breaker which has separable contacts independently operable to interrupt each phase, for simultaneously separating all of the contacts in response to a ground fault.

It is also an object of my invention to provide in a polyphase circuit interrupter for utilizing electroresponsive means responsive to line currents for effecting operation in response to one type of faults, and means responsive to ground fault currents for operation in response to another type of fault, and for using a common counter for effecting lockout of the interrupter under either type of fault.

These and other objects of this invention will become more apparent upon consideration of preferred embodiments thereof described in the following specification and shown in the attached drawings, in which.

Figure 1:
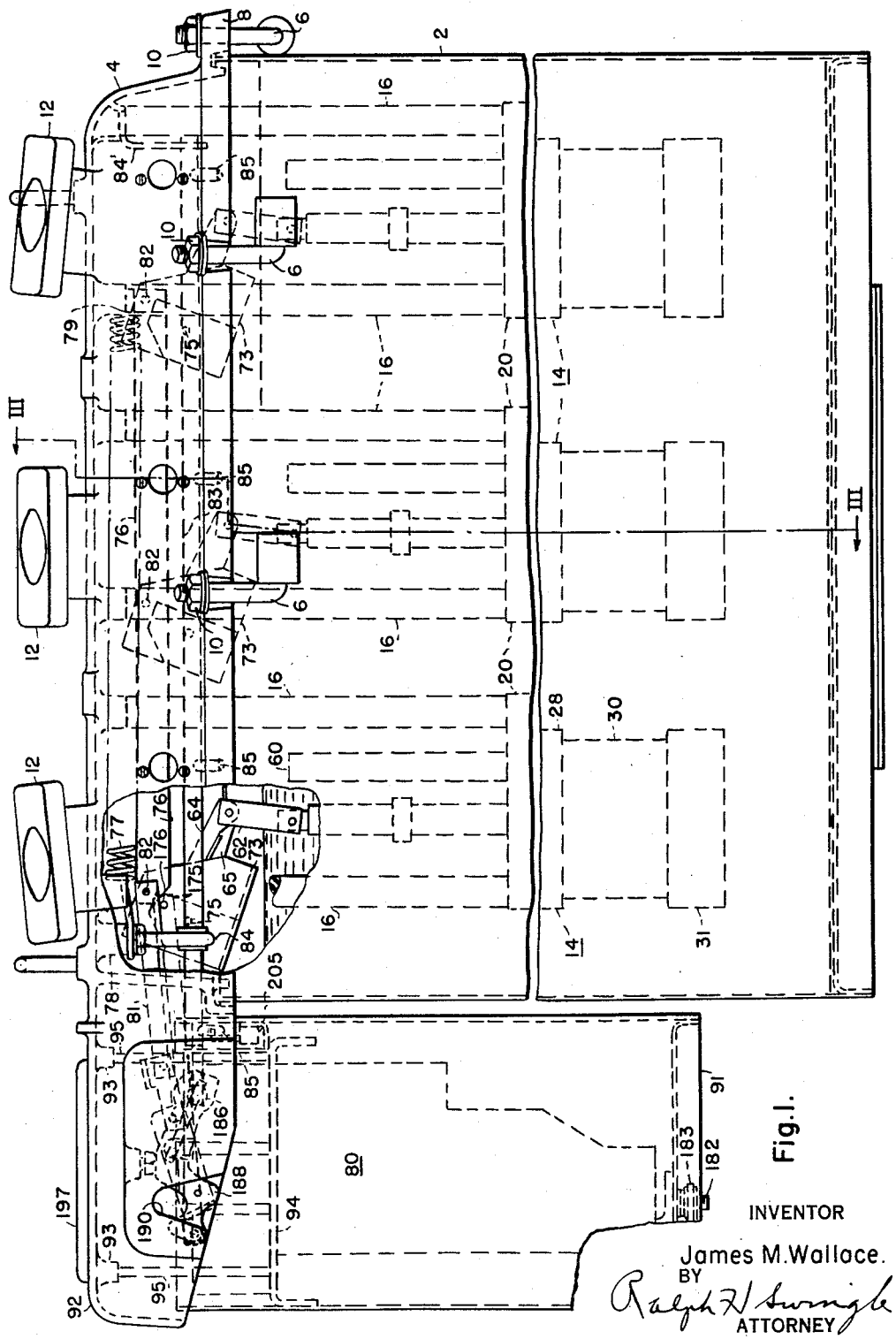
Figure 1 is a side elevation view, partly broken away, and with certain parts in section, illustrating a three-pole power-operated circuit-interrupting device constructed in accordance with one embodiment of this invention.

The circuit interrupting device shown in Fig. 1 is mounted in a metal tank 2 having an open top adapted to be closed by a hollow cover casting 4, which may be secured to the tank in any desired manner, for example as by bolts 6 secured to the tank and adapted to extend through openings in cover flange 8, to have nuts 10 thereon for drawing the cover down tight on the upper edge of the tank.

Figure 3:
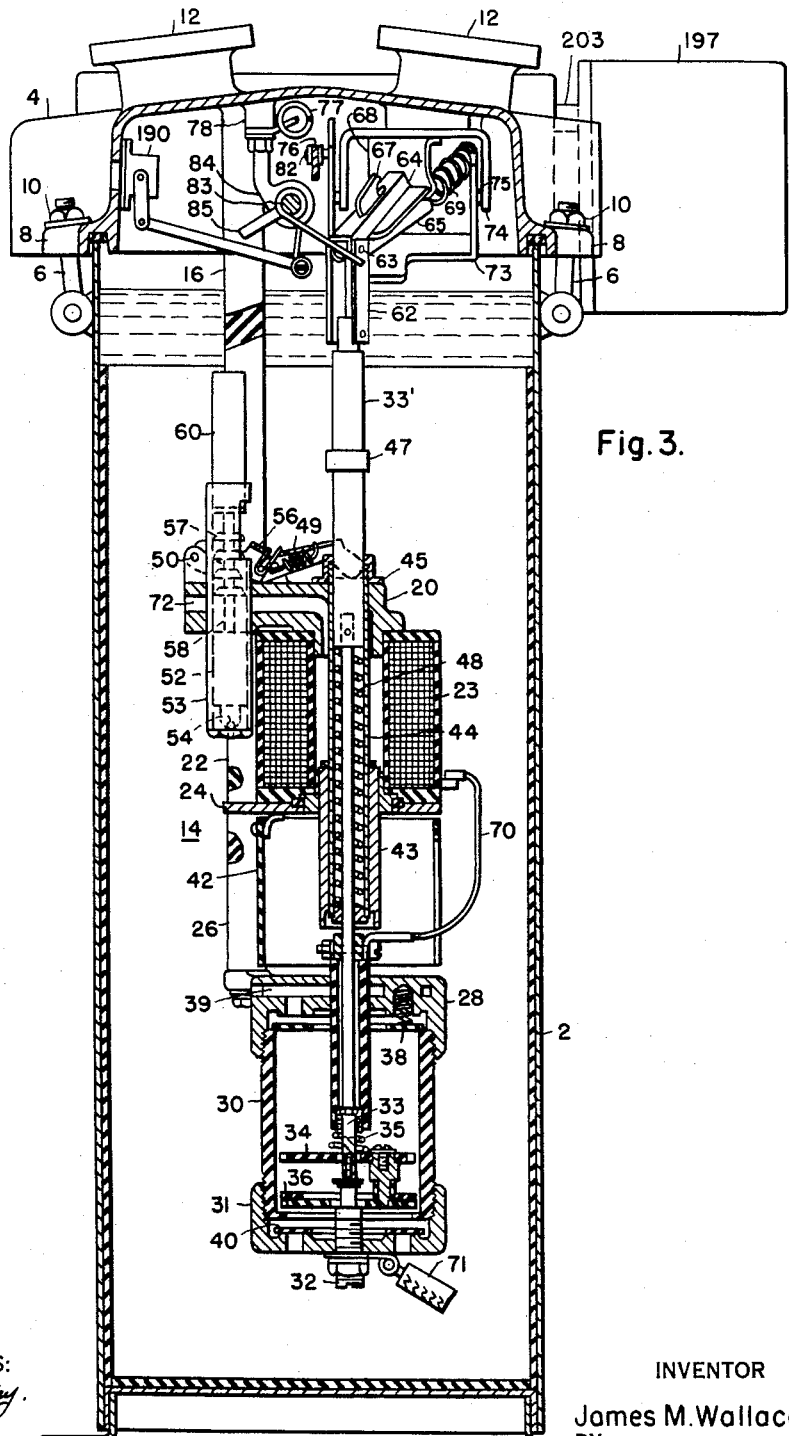
Fig. 3 is a transverse section of the interrupter shown in Fig. 1 illustrating one of the automatic reclosing units, and taken substantially on the line III—III of Fig. 1.

The circuit interrupting device illustrated is substantially identical with that of copending application Serial No. 184,482 now Patent 2,748,221 of Andrew W. Edwards et al. entitled "Circuit Interrupter Operating Mechanism," issued May 29, 1956 and assigned to the assignee of the present invention, and is shown as having three poles, with the cover having three spaced pairs of bushing supports 12 on which lead-in bushings for line conductors may be mounted. A switch unit 14 is provided for each pole, each of the switching units 14 being capable of automatically opening and closing the circuit. Each of these automatic reclosing units 14 is supported from cover 4 by supporting rods 16 which are directly secured to a casting 20 at their lower ends. Additional supporting rods 22 are for the purpose of supporting a series operating coil 23 between casting 20 and a supporting plate 24 spaced beneath the casting, and still further supporting rods 26 are for the purpose of supporting at their lower ends the top cap 28 of an arc chamber 30 from supporting plate 24. The supporting rods are as shown in Fig. 3, preferably of an insulating material. Arc chamber 30 includes a tube of insulating material, such as fiber, threaded into top cap 28, and having a bottom cap 31 threaded on the lower end thereof. A stationary contact screw 32 is threaded into a center opening provided in bottom cap 31 of the arc chamber, and it is adapted to be engaged within the chamber by the lower end of a movable contact rod 33 having a liquid directing structure 34 slidably mounted thereon within the arc chamber. Liquid directing structure 34 has lost motion relative to the contact and is biased downwardly by a spring 35 and further includes a check valve ring 36 providing for freer movement of the movable contact rod and liquid directing structure downwardly than in an upward direction, and the arc chamber itself is provided with an outlet valve ring 38 spring biased to normally uncover outlet passage 39 in the top cap 28, and an inlet check valve ring 40 controlling inlet openings in bottom cap 31.

A tubular gas shield 42 of insulating material, such as fiber, is supported between top cap 28 of the arc chamber and supporting plate 24 for the bottom of series coil 23, being secured to plate 24, to prevent gases escaping from outlet 39 of the arc chamber from gaining access to the central part of the casing in the vicinity of contact rod 33. A tubular solenoid core 43 is slidably mounted within series coil 23 and telescopically on contact rod 33, with an actuating tube 44 projecting upwardly therefrom to have an actuating washer 45 secured thereon at the top of casting 20, and being engageable with an integral shoulder 47 provided on the upper part 33' of contact rod 33. A coil compression spring 48 is interposed between solenoid core 43 and a shoulder adjacent the lower end of the upper portion 33' of contact rod 33 to be compressed as the core is attracted upwardly by coil 23.

In order to count the number of closely successive interrupting operation of the interrupting device, an actuating lever 49 is pivotally mounted on casting 20 as at 50, with its outer end resting on actuating washer 45, for advancing a counting piston 52 mounted in a vertical counting cylinder 53 having a liquid inlet in the bottom thereof controlled by a check valve 54, by means of a pawl portion 56 on the actuating lever which is engageable with ratchet teeth 57 formed on a rod 58 which extends upwardly from piston 52. At the upper end of piston rod 58, there is provided an operating rod 60 for a purpose to be described.

The upper portion 33' of contact rod 33 of each operating unit is pivoted to a pair of connecting links 62 which, in turn, are pivoted on a common pivot 63 to adjacent ends of a channel-shaped link 64, and a link 65 which has a hook portion 67 extending through an opening in the channeled link 64. The other end of channeled link 64 is pivoted in pivot depressions formed in the lower end of a pivot supporting bracket 68 secured to a lug integral with tank cover 4, and the two links 64 and 65 are held at the position shown by a coiled tension spring 69 engaged between a lug integral with tank cover 4 and link 65, to thus not only maintain the links in the position shown in Fig. 3, but also to exert substantial pressure on the contacts at the closed circuit position.

In operation, each automatic reclosing unit 14 being structurally substantially identical with the unit disclosed in the copending application of J. M. Wallace et al., Serial No. 162,174 now Patent 2,647,184, entitled "Time Delayed Circuit Breakers," which issued on July 28, 1953 and assigned to the same assignee as this invention, will operate in substantially the same manner as the units in such copending application. Accordingly, for a more complete description of the parts of each unit 14 and the mode of operation, reference is hereby made to the aforesaid copending application.

In general, operating coils 23 being connected in series in the respective phase conductors by a conductor (not shown) leading to one of the bushings on cover 4 and conductor 70 connecting each coil to its contact rod 33, and thence by a conductor 71 to the other bushing mounted on tank cover 4, each coil will operate to attract its solenoid core 43 on overcurrents in its circuit conductor, and after compressing spring 48 during upward movement, the core will eventually cause the washer 45 at the upper end of its tube 44 to engage shoulder 47 on the contact rod to separate the movable contact from stationary contact screw 32, and thus draw an arc in arc chamber 30. The arc thus drawn will be acted on by liquid directed through the arc by the liquid directing structure 34 which is picked up by the movable contact rod in its upward movement. The pressure existing within the arc chamber during arcing operates to seal off the inlet and outlet valves 40 and 38, respectively, and also acts to accelerate opening movement of the contact rod. Likewise upward movement of actuating sleeve 44 operates lever 49 and pawl 56 to advance counting piston 52 a predetermined amount. As soon as the arc within arc chamber 30 is extinguished, the movable contact rod is free to return, due to the force of gravity, and possibly some force due to spring 69, to thus automatically reclose the circuit through each unit. In doing so, the arc chamber 30 may be flushed out by gases escaping through the top cap 28 being replaced by fresh liquid entering the inlet openings in the bottom cap 31.

In the event of continuing overload, operation of the unit continues with counting piston 52 being moved forward a further amount each time, and the counting piston may also control the effective size of outlet passage 72 in casting 20 for varying the rate of fluid displacement by the armature 43 during its upward movement. Accordingly, initial circuit opening operations will be substantially unaffected and will occur substantially instantaneously, but when the piston arrives at the passage 72, which may for example, occur at the end of the second opening operation, it will obstruct the passage, to thus slow down subsequent circuit opening operations occurring in close succession thereafter, due to the dashpot action of core 43. Of course, if the overload is not a continuing one, counting piston 52 will slowly reset by the displacement of liquid trapped beneath the same when it was advanced, through the small clearance between the piston 52 and cylinder 53, so that if a continuing overload appears on the circuit at a later time, it will again operate to count only closely successive circuit opening operations.

In the automatic circuit opening and closing operations described above, each unit 14 is operable independently of the other, so that if the overload occurs on only one phase, only the unit 14 located in that phase conductor will operate, with the other units remaining closed.

As shown in Figs. 1 and 3, a generally U-shaped bracket 73 has its leg portions pivotally mounted at 75 on the leg portions of an inverted U-shaped supporting bracket 74 having the bight portion of the latter secured to an integral supporting lug in cover 4 for tank 2, there being such brackets for each of the automatic reclosing units 14, with the bight portion of each bracket 73 being positioned beneath links 64 and 65 connected to the upper end of the contact rod 33 of the respective units. One leg of each bracket 73 has pivotally connected therewith as at 82, a connecting rod 76 which is common to all of the units, having the bracket 73 of each unit pivotally connected thereto. Connecting rod 76 is biased to the left as viewed in Fig. 1 in a direction to rotate brackets 73 counter-clockwise to bring their bight portions into engagement with their respective links 65 to raise the contact rods 33 and hold them at an open circuit position, by a coil tension spring 77, having one end secured to a lug 78 integral with cover 4, and having the other end secured to an angled end 79 of connecting rod 76. However, connecting rod 76 is normally locked against movement by an operating mechanism 80, since the inner end of the connecting rod is pivotally connected to a toggle link 81 thereof as at the pivot point 82.

Also common to all of the automatic reclosing units 14 is a trip shaft 83 which extends in proximity to the upper ends of all of the units, being rotatably supported at its inner end in a bearing bracket 84 suspended from the cover 4, and at its outer end in a bearing bracket 84' also supported from the cover. Trip shaft 83 is provided with a plurality of radially extending cranks 85, there being one for each automatic reclosing unit 14, and an additional one located within a container 91 for the operating mechanism, for a reason which will be hereinafter explained.

The hollow cover 4 for tank 2 has an integral extension 92 at one end which extends outwardly beyond that end of the tank and has therein integral supporting lugs 93 for supporting a plate 94 at a position spaced beneath the cover, as by one or more operating mechanism supports 95.

Figure 2:
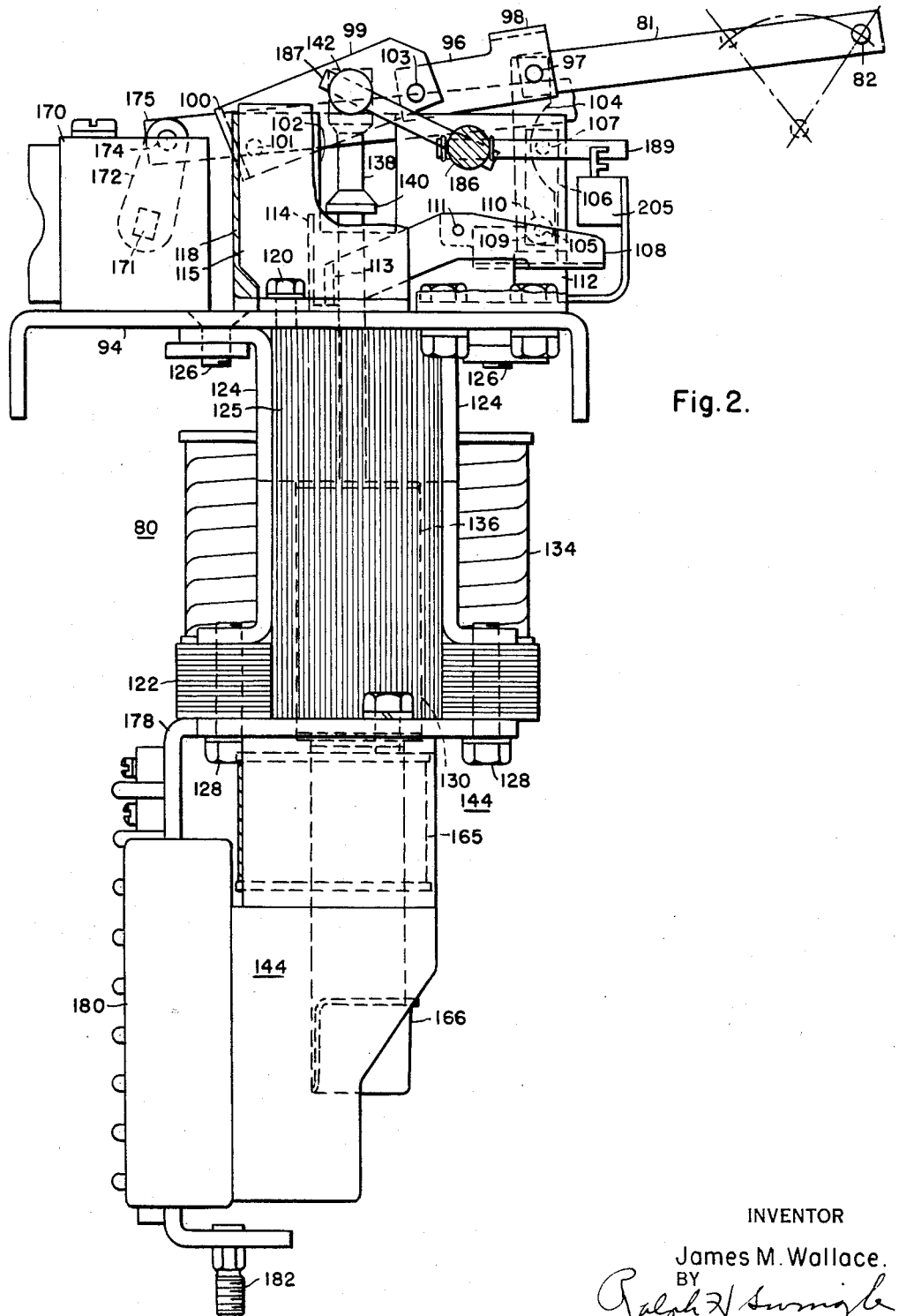
Fig. 2 is an enlarged side elevation view of the power operating mechanism shown in Fig. 1, with the cover removed and certain of the parts broken away and illustrated in section.

The operating mechanism as shown partly in Fig. 1 and principally in Fig. 2 includes a toggle linkage mounted on top of supporting plate 94 comprising the toggle link 81 which is connected to the pivot 82 for the adjacent switch unit 14 at one end, and at its other end is connected to a second toggle link 96 which is of inverted U-shape at the end adjacent of link 81, to form one overcenter pivot 97. Toggle link 96 has a bight portion 98 overlying the adjacent end of link 81 to limit relative movement of overcenter pivot 97 downwardly. A third toggle lever 99 also of U-shape has the legs thereof adjacent bight portion 100 mounted on a stationary pivot 101 on a stationary supporting bracket 102 also of substantial U-shape with its bight portion secured to the upper side of mechanism supporting plate 94. Toggle lever 99 is connected to link 96 by an overcenter pivot 103, so that the toggle linkage includes the two overcenter pivots 97 and 103.

Overcenter pivot 97 of the toggle linkage is adapted to be held against movement at the closed circuit position of the interrupting device by means of a toggle latch link 104 pivoted on the same axis as overcenter pivot 97 at one end, and at its other end having an overcenter latch pivot 105 with a second toggle latch link 106, which, in turn, is stationarily pivoted at 107 between the legs of bracket 102. It will be observed that at the closed circuit position of the parts illustrated in Figs. 1 and 2, overcenter pivot 97 is slightly above the center line between toggle pivots 103 and 82, so that spring 77 tends to break this toggle upwardly but this is prevented by a latch lever 108 having a latch shoulder 109 engaging a roller 110 provided on overcenter latch pivot 105 which prevents this pivot from moving to the left as viewed in Fig. 2, and consequently holds overcenter pivot 97 of the overcenter linkage from breaking upwardly. Latch lever 108 is mounted on a stationary pivot 111 at one end outside of bracket 102 with an inwardly directed part extending through an opening 112 in one side of bracket 102 to support shoulder 109 inside the bracket, and having at the opposite end a laterally extending portion 113, for a purpose to be described.

Figure 4:
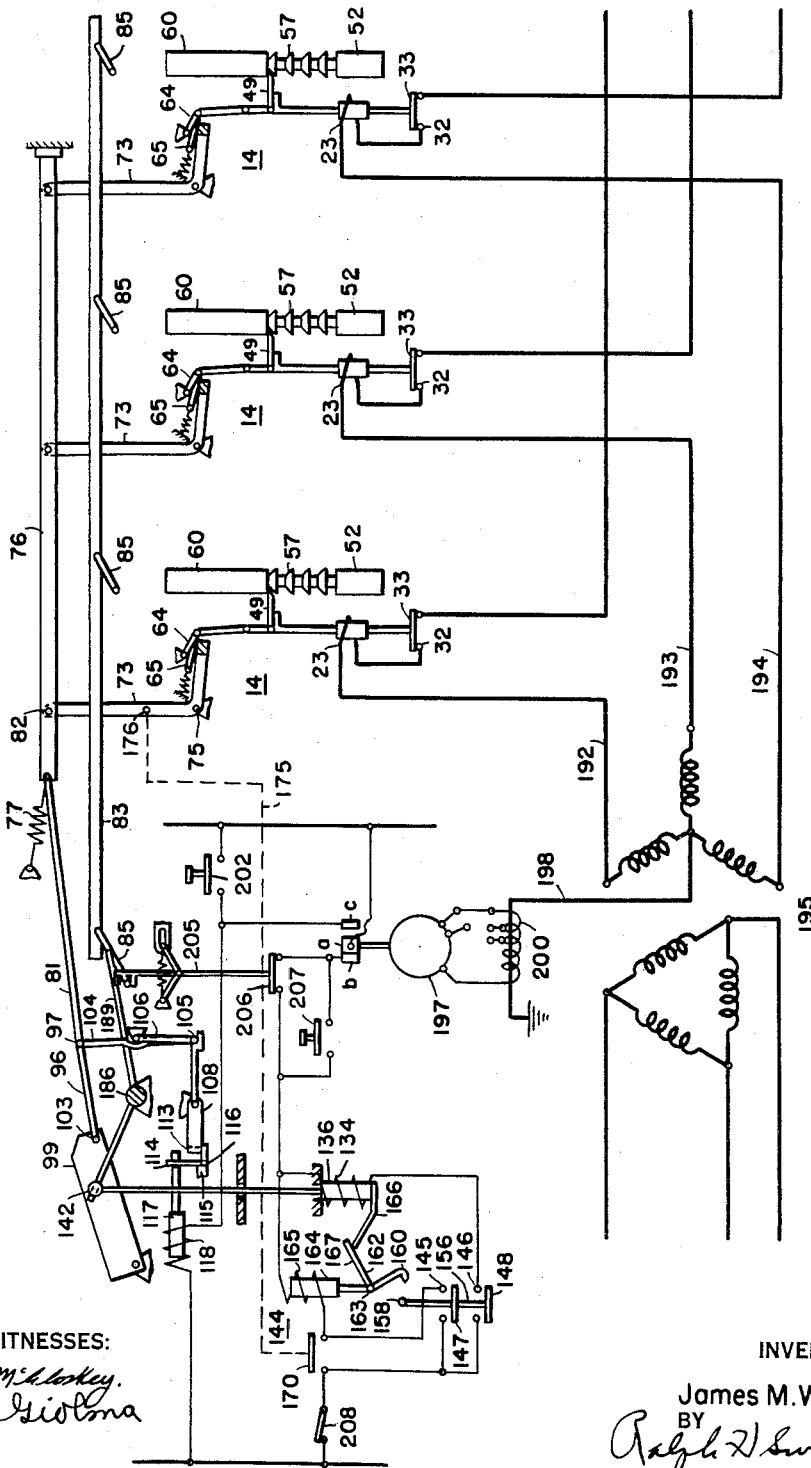
Fig. 4 is a diagrammatic view of a ground fault relaying system embodying the automatic reclosing device of Fig. 1.

Referring to Fig. 4 of the drawings, it will be observed that extension 113 of latch lever 108 overlies one leg of a latch release bell crank 114 pivotally mounted on a supporting frame 115 at 116. The other end of latch release bell crank 114 is received in an annular groove provided in the outer end of the core 117 of a trip coil 118, which is mounted within supporting frame 115 of inverted U-form, and secured to mechanism supporting plate 94, as by the bolts 120.

A laminated plate 122 of magnetic material, such as soft iron, is supported at a point spaced beneath mechanism supporting plate 94 by a pair of channel-shaped supporting plates 124, which may also be of magnetic material with the channel plates being secured to mechanism supporting plate 94 as by bolts 126, and supporting magnetic plate 122 as by bolts 128. Magnetic plate 122 is provided with a central opening 130, which lines up with the central opening in a closing coil 134 mounted in cutout parts of channel supporting plates 124 and laminations 125 therebetween, with the former openings adapted to receive an armature 136 for closing coil 134, and the armature has an operating rod 138 projecting from the upper end thereof. Armature operating rod 138 has an integral stop flange 140 thereon positioned above mechanism supporting plate 94 and at its upper end is pivoted as on pivot pin 142 to toggle lever 99.

It will now be observed that in the closed position of the circuit interrupting device shown on the drawings, both overcenter pivot 97 and 103 of the toggle linkage are held at positions slightly above their central positions so that contact opening spring 77 tends to break both of these toggles upwardly, and both are held against such movement, with overcenter pivot 97 being held by latch 108 and overcenter pivot 103 being held against further upward movement by engagement of armature 136 of the closing coil with a stop formed by central depending portions of coil supporting channel plates 124 and the laminations 125 therebetween. Opening of the contacts can be accomplished from a remote location by causing energization of trip coil 118, which will attract its armature 117 inwardly to rotate latch release lever 114 in a counter-clockwise direction (Fig. 4) to thus rotate latch release lever 108 clockwise (Figs. 2 and 4), to release overcenter latch pivot 105 and permit the linkage to move from the position shown in Figs. 1 and 4 to that where overcenter pivot 97 breaks upwardly. After this has occurred, the biasing force of gravity on core 136 of the closing solenoid moves it and toggle link 96 downwardly, and the parts ultimately reach a position where overcenter latch pivot 105 will again be latched by latch lever 108. The linkage now is in condition for closing the contacts of the circuit interrupting device from a remote point by causing energization of closing coil 134, which attracts its armature 136 upwardly forcing counter-clockwise rotation of toggle link 99 to thus restore the linkage to the position shown in Figs. 2, 3 and 4 with the contacts of the circuit interrupting device closed.

For the purpose of energizing closing coil 134, there is provided a relay 144 which is mounted beneath the closing solenoid 134. Relay 144 is, as shown in Fig. 4, provided with two sets of spaced stationary contacts 145 and 146. These stationary contacts 145 and 146 are adapted to cooperate with movable contacts 147 and 148 mounted on one end of a contact lever 156, also preferably of a molded insulating material, carrying at the other end thereof a transverse actuating pin 158. In closing the relay contacts, the actuating pin 158 of the contact lever is adapted to be engaged by the shoulder 160 on an operating link 162 which is pivotally mounted at 163 in the lower end of an armature 164 for relay coil 165. Operating link 162 of the relay may be normally biased in a clockwise direction, as viewed in Fig. 4 to cause engagement of its shoulder 160 with actuating pin 158 of the contact lever 156, by a suitable spring (not shown). Movable contact lever 156 is biased for movement to disengage movable contacts 147 and 148 from stationary contacts 145 and 146. For the purpose of releasing operating link 162 from actuating pin 158 of the contact lever, there is secured to the lower end of the armature 136 of the closing coil 134, an angularly shaped extension 166 having an outer end which extends into proximity with an angular extension 167 on operating link 162 to move its shoulder 160 out from beneath actuating pin 158 on the contact lever, to thus mechanically disconnect the relay armature 164 and movable contact lever 156 from operating link 162 when the solenoid core 136 attains its uppermost or closed circuit position, so that the relay contacts are then permitted to be opened, and shoulder 160 is prevented from re-engaging pin 158, irrespective of whether or not relay coil 144 is then energized.

At the position of the parts of the relay shown in Fig. 4 of the drawings, extension 166 from the core 136 of the closing solenoid has engaged extension 167 of link 162 to remove shoulder 160 from beneath actuating pin 158 on the contact lever 156, and the relay contacts have opened. With the relay contacts open, closing coil 134 and relay coil 165 are then both deenergized, and armature 164 of the closing relay is prevented by extension 166 from descending under the influence of gravity.

If trip coil 118 is energized, toggle latch lever 104 is released permitting lever 99 to rotate clockwise and armature 134 to drop. This removes extension 166 from interfering with extension 167 of link 162, thus permitting operating link 162 to rotate in a clockwise direction where it will be in a position to re-engage actuating pin 158 of the relay contact lever, as soon as armature 164 of the relay coil descends a sufficient distance. Upon re-energization of relay coil 165, as by closing switch 207 or otherwise, its armature will be drawn upwardly and the operating link will carry actuating pin 158 upwardly to close the relay contacts. Then closing coil 134 will be re-energized through contacts 146 and 148 and its armature 136 will be moved upwardly to close the contacts of the interrupting device as previously explained, and ultimately cause operating link 162 to be moved out from under actuating pin 158, thus mechanically releasing the relay contacts for opening movement when the closing solenoid has completed its travel and the contacts of the interrupting device are closed.

At the left as viewed in Fig. 2, mechanism supporting plate 94 has an integral extension on which is mounted a limit switch 170. This switch has an operating shaft 171 provided with an operating crank 172 at the outer end of which is pivotally connected as at 174, a link 175 connected at its other end to the adjacent bracket 73 as by pivot 176. Limit switch 170 includes a plurality of sets of stationary contacts spaced along the length thereof and adapted to cooperate with bridging contacts to connect the circuit between each set of stationary contacts dependent upon the position of the contacts of the circuit interrupting device. Each of the stationary contacts of the limit switch has a terminal at the exterior for connection of the various circuits thereto include indicator lighting circuits, for indication of the condition of the circuit interrupting device at a remote location.

A supporting bracket 178 is secured to the lower side of magnetic plate 122 of the operating mechanism as by bolts 128 and it, in turn, supports a terminal block 180 of insulating material, such as porcelain, having a plurality of terminal screws thereon to which the various connections to the electrically energizable components of the operating mechanism may be made. The support 178 for the terminal block also is provided with a screw threaded stud 182 projecting downwardly to be received in an opening in the bottom wall of casing 91 for the operating mechanism and then have a nut 183 threaded thereon to hold the casing 91 in a position where it receives the operating mechanism and forms a substantially complete enclosure therefor with cover 4 for tank 2.

In order to manually operate the circuit interrupting device, an operating shaft 186 is journaled in the bracket 102 on mechanism supporting palte 94 and it has a radially projecting pin 187 slidably received in an opening provided in pivot pin 142 of toggle link 99. Operating shaft 186 extends beyond the operating mechanism to have an operating handle 188 secured thereon which is normally positioned (Fig. 1) beneath an offset hood portion 92 provided integral with one side of tank cover 4, and having a notch 190 therein through which the outer end of the handle is accessible for operation, as by a hook-stick operating member or the like. A lever 189 is provided on shaft 186 to be engaged by radial rod 85 beneath the extension 91 of the cover for tripping the interrupters and locking them open in response to predetermined movement of counter rods 60.

Assuming the parts of the operating mechanism and circuit interrupting device to be at the closed circuit position illustrated, it will be apparent that by pulling downwardly on handle 188, the operating shaft 186 will be rotated in a direction such that its operating pin 187 causes toggle link 99 to move downwardly, thus moving overcenter pivot 103 downwardly and over its center to the position where the toggle linkage is broken, and at which position the circuit interrupting device is held at open circuit position by spring 77 mounted in cover 4. At this time, handle 188 will project beneath cover hood 92, and it will be apparent that by moving this back up to the position shown in Fig. 1, toggle link 99 will be moved back upwardly to move overcenter pivot 103 upwardly overcenter to the position shown in Figs. 2 and 4 where it is held by engagement of core 136 of the closing coil with shoulders formed on channel supporting plates 124, with the contacts of the circuit interrupting device thus being held at their closed circuit position.

As previously described, the counting piston 52 of each automatic reclosing unit 14 may, on sustained overload in that particular phase of the circuit, be advanced upwardly until after a predetermined number of closely successive operations the operating extension 60 thereof engages the radial crank 85 on trip shaft 83 located immediately thereabove, to rotate the trip shaft and thus cause the inner radial crank 85 to rotate operating shaft 186 in a direction to move toggle lever 99 downwardly and overcenter pivot 103 downwardly overcenter, to thus release tension spring 77 to move connecting rod 76 to the left. Such movement of connecting rod 76 carries with it each of the brackets 73, causing each bracket to lift the movable contact rod of its unit 14 and thus open the contacts of all of the units and hold them open. Also, as described hereinbefore, the contacts of all units 14 may be opened from a remote location by energization of trip coil 118, which releases overcenter pivot 97 for movement upwardly, and this also releases spring 77 and permits it to open the contacts of all units 14, as previously described. Also the contacts of all units 14 may be manually opened and closed by movement of handle 188 in opposite directions, as previously described, because this will move overcenter pivot 103 of the linkage overcenter in opposite directions to either release spring 77, or prevent operation thereof. Furthermore, when the contacts of all units 14 have been opened by either manual, power, or automatic operation, they may be closed by energization of closing coil 134 from a remote point, which operates to reset toggle lever 99 and overcenter pivot point 103 to the position shown in Figs. 2 and 4.

Referring to Fig. 4 of the drawings, it will be seen that the electrically operated three phase circuit interrupter of Fig. 1 may be used in conjunction with other apparatus to provide ground fault protection by connecting the switch units 14 thereof in the several conductors 192, 193 and 194 of a polyphase circuit, which may be supplied with electrical energy from the Y connected secondary of a transformer 195.

Ground fault responsive means such as, for example, a ground fault relay 197 of the induction type may be connected in circuit with the grounded neutral 198 of the transformer by means of a current transformer 200, tapped connections being provided on the transformer and relay to cover a range of different trip values, and said ground fault relay having a moving contact (a) which normally engages a back contact (b) and is actuated in response to a fault current in the grounded neutral to engage a contact (c). The contact (c) may be connected to the trip coil 118 in shunt with a pushbutton trip switch 202, while the contact (b) may be connected to the closing coil 134 and the operating winding 165 of the closing relay 144 to provide for tripping the interrupter in response to a ground fault current and reclosing it when the fault current disappears. The relay 197 may be mounted on the cover 4, being, for example, secured to the extension 92 which supports the closing and tripping coils, by means of a conduit connection 203 as shown in Fig. 3.

In order to provide for reclosing the interrupter only a predetermined number of times in the event of a continuing ground fault, a lockout switch 205 may be connected in circuit with the closing coil and closing relay as shown in Fig. 4. This switch may be mounted in the casing 91 as shown in Fig. 1 and may be actuated by the arm 85 under the extension 91, so as to interrupt the energizing circuit for the closing coil and closing relay when the counters 60 are advanced by their levers 49 in response to opening of the interrupters.

With the system in the operating condition shown in Fig. 4, the interrupter units are all closed. Should a ground fault occur, current through current transformer 200 causes relay 197 to operate, contact (a) moving from contact (b) to contact (c). This completes an obvious energizing circuit for trip coil 118 which actuates armature 117 to the left, rotating bellcrank lever 114 counterclockwise and latch lever 108 clockwise to release latch pin 105. Toggle levers 104 and 106 move clockwise, permitting toggle pivot 97 to rise and break the toggle relation of levers 96 and 81. Lockout spring 77 is thereupon effective to move connecting rod 76 to the left, actuating toggle levers 64 and 65 to open contacts 32 and 33 of all units. Counters 60 are notched upwardly by levers 49 during opening.

Lever 99 rotates clockwise and armature 136 drops, permitting link 162 to engage pin 158 of switch member 156. The limit switch 170 closes when the connecting rod 76 moves brackets 73 counter-clockwise. Since the ground fault relay 197 returns to the position shown when the fault current is interrupted by the units 14, an energizing circuit is provided for operating winding 165 of the closing relay through limit switch 170, winding 165, contact 206 of auxiliary switch 205, contact (b) and contact (a) of relay 197. Closing relay 144 operates, and provides an energizing circuit for closing coil 134 through contact 148, and a holding circuit for itself through contact 147. Armature 136 is picked up and rotates lever 99 counterclockwise to restore toggle levers 99 and 96 to their overcenter relation, levers 104 and 106 having reset in the position shown. Extension 166 of armature 136 engages extension 167 of link 162, releasing contact member 156 and interrupting the energizing circuits of closing relay winding 165 and closing coil 134.

Should the fault be removed, the interrupter switches 14 will remain closed and counter rods 60 will slowly reset. If the fault continues, the switches will again open, notching counter rods upwardly another step, and relay 197 will effect reclosing as previously described. Upon the occurrence of a predetermined number of such openings, four, for example, counter rods 60 will engage associated radial rods 85. This rotates shaft 83 and the radial rod 85 beneath the extension. Rod 85 engages lever 189 and trips the interrupter by rotating shaft 142 clockwise to break toggle levers 99 and 96 downwardly. At the same time auxiliary switch 205 is operated to separate contacts 206 in the closing circuit. Reclosing may be effected either manually by operating handle 188 or by operating a pushbutton switch 207. A disconnect switch 208 is provided for disabling the reclosing apparatus.

From the above description and the accompanying drawings, it will be apparent that I have provided in a simple and effective manner for protecting grounded circuits against both overcurrent, and the much lower value ground fault conditions. For example, with a 100 ampere reclosing circuit breaker which normally trips on a 200 ampere fault current, ground fault tripping may be effected from 25 amperes up to 200 amperes. Apparatus embodying the features of my invention may comprise a substantially unitary design with the auxiliary switch and fault relay mounted integral with the circuit interrupter. This provides a simple and compact arrangement and permits the use of a minimum of equipment for both types of protection.

Since certain changes may be made in the above-described construction, and different embodiments of the invention may be made without departing from the spirit or scope thereof, it is requested that the matter contained in the above description and shown in the accompanying drawings be considered as illustrative and not in a limiting sense.

I claim as my invention:

1. In a circuit interrupter, separable contacts, electroresponsive means operated by a predetermined current condition to separate said contacts, said contacts being biased to reclose following such a separation, means operable to lock said contacts in a separated condition, additional electroresponsive means selectively operable to render the locking means effective and ineffective, and counting means operable to prevent said additional electroresponsive means from rendering the lockout means ineffective.

2. In a circuit interrupter, a casing, a cover for said casing, separable contacts supported from said cover in said casing, electroresponsive means supported from the cover operable by a predetermined value of current to separate said contacts, means biasing said contacts to reclose following such a separation, normally ineffective lockout means operable to open said contacts, additional electroresponsive means operable to selectively render the lockout means effective to open said contacts or render it ineffective thereby causing closing of the contacts, relay means operable in response to a predetermined fault condition to provide for effecting operation of the additional electroresponsive means, a counter operable to effect operation of the lockout means, and means operable in response to such operation of the counter, to prevent the additional electroresponsive means from rendering the lockout means ineffective.

3. A circuit interrupter comprising, separable contacts biased to close, electroresponsive means having a part movable by a predetermined overcurrent to effect separation of the contacts, lockout means including a spring biased member operable to effect separation of said contacts and/or maintain them separated, counting means operable to render said lockout means operable after a predetermined number of such separations, operating means selectively operable to render the lockout means effective to separate the contacts and effect closing of said contacts, relay means selectively responsive to a predetermined fault condition and to interruption of said fault condition to effect operation of the operating means to effect separation and reclosing of said contacts, and switch means operable in response to predetermined operation of the counting means to prevent operation of the operating means to effect reclosing of said contacts.

4. In a circuit interrupter, separable contacts, electroresponsive means operable by one fault condition to effect separation of said contacts, said contacts being biased to reclose following such a separation, lockout means biased to hold said contacts separated, restraining means normally preventing said lockout means from operating, counting means operable in response to a predetermined number of separations of said contacts to render said restraining means ineffective, operating means selectively operable to render the lockout means and the restraining means effective, relay means responsive to the occurrence of a different fault condition and to the separation of said contacts to selectively effect operation of the operating means to render the lockout means and the restraining means effective, and switch means actuable only in response to operation of the counting means in response to a predetermined number of separations of said contacts to prevent the operating means from rendering the restraining means effective.

5. In a circuit interrupter, a container having a cover, separable contacts supported from said cover, electroresponsive means supported from said cover for effecting separation of said contacts by a predetermined current condition, said contacts being biased to reclose following such a separation, lockout means biased to separate said contacts, releasable restraining means normally making the lockout means ineffective, a counter operable in response to closely successive separations of said contacts to release the restraining means after a predetermined number of such separations, electromechanical operating means operable to release said restraining mans and return it to a restraining position, a fault relay mounted on the cover selectively operable in response to a different current condition to effect operation of the operating means, and a switch actuated by the counter after the predetermined number of contact separations connected in circuit with the operating means to prevent operation of the operating means to return the restraining means to its restraining position.

6. A circuit interrupter comprising, separable contacts, electroresponsive means operable by a predetermined value of current to effect separation of said contacts, said contacts being biased to reclose following such a separation, lockout means operable to hold said contacts separated, an operating mechanism for said contacts including a toggle linkage having two overcenter pivots adapted to restrain said lockout means when both pivots are held in said overcenter positions, separate means for holding the pivots in said positions, one of said means being releasable to release its pivot, the other holding means comprising a stop for an operating member connected to one of the levers of said toggle linkage having a fixed pivot, closing means operable to actuate said operating member to effect restraint of the lockout means and effect closing of said contacts, trip means operable to release the releasable holding means to effect separation of the contacts, a counter operable to actuate the lever having the fixed pivot to break said toggle linkage and render the lockout means effective, relay means operable in response to a different value of current to effect operation of the trip means, said relay normally providing an operating circuit for the closing means, and a switch actuated by the counter to interrupt the operating circuit for the closing means.

7. A polyphase circuit interrupter comprising, a plurality of sets of separable contacts, electroresponsive means individual to each set of contacts operable by a predetermined current condition to effect separation thereof, each set of contacts being biased to reclose following such a separation, a common lockout means operable to bias all sets of contacts open, restraining means normally restraining said lockout means from being operative, a counter individual to each set of contacts operable in response to a predetermined number of separations in close succession of its associated contacts to render the restraining means ineffective, electromechanical operating means selectively operable to render the restraining means effective and ineffective, relay means operable in response to a different predetermined current condition to set up circuit for selectively operating the operating means to open and close the interrupter contacts, and a switch actuated in response to movement of a counter to interrupt the circuit for the operating means.

8. A polyphase circuit interrupter comprising, a set of separable contacts for each phase of a polyphase circuit, electroresponsive means having a movable part operable in response to a predetermined current in a particular phase to separate the contacts of that phase, lockout means operable to maintain the contacts of all phases open, restraining means for preventing the lockout means from operating, a counter individual to each set of contacts operable in response to a plurality of closely successive contact separations to render the restraining means ineffective, electromechanical operating means operatively connected to the restraining means operable to selectively render the restraining means ineffective and effective, a relay operable in response to a ground fault on any phase to effect operation of the electromechanical means to render the restraining means ineffective, said relay being operable upon interruption of the circuit to set up an operating circuit for effecting operation of the electromechanical means to render the restraining means effective, and a switch actuated by the counters in response to a plurality of closely successive contact separations to interrupt said operating circuit.

9. Protective apparatus for a grounded polyphase circuit comprising, a circuit interrupter having a set of separable contacts in each phase, electroresponsive means connected in series with each set of contacts and having a part movable by a predetermined overcurrent to separate said contacts, lockout means operable to bias said contacts open, restraining means normally rendering said lockout means inoperative including a toggle lever mechanism connected to the lockout means and having two overcenter pivots, releasable means holding one of said pivots in said overcenter position, a movable member connected to a lever carrying the other of said pivots, a stop engaging said member to hold said other pivot in its overcenter position, operating means for actuating said member to move said other pivot to its overcenter position, trip means operable to release said releasable means, a counter associated with each of the electroresponsive means operable in response to a predetermined number of closely successive operations of the electroresponsive means to effect movement of said other pivot to collapse the toggle lever mechanism, a ground fault relay having a movable contact normally connected to effect energization of the trip means and operable in response to a ground fault current to effect energization of the operating means, and a switch actuated in response to operation of any one of the counters to prevent energization of the operating means.

10. Ground fault protective apparatus for a three phase system having a grounded neutral comprising; a circuit interrupter having a set of separable contacts for each phase, electroresponsive means for each set of contacts having a part operable to effect separation of said contacts by a predetermined value of current therethrough, lockout means operable to bias all of said contacts open, releasable restraining means normally preventing the lockout means from operating, a counter for each set of contacts operable in response to a plurality of closely successive separations thereof to release said restraining means, operating means and trip means selectively operable to render the restraining means effective and to effect release thereof, a ground fault relay normally setting up an operating circuit for the operating means and operable in response to a fault current in the grounded neutral of the system to provide an operating circiut for the trip means, and a switch actuated in response to release of the restraining means by operation of a counter to interrupt the operating circuit of the operating means.

11. In a circuit interrupter, separable contacts, electroresponsive means actuated by current of a predetermined value for directly effecting separation of said contacts, additional electroresponsive means responsive to a current of a lesser value to effect separation of said contacts, and means including a counting device operable in response to a predetermined number of closely consecutive separations of said contacts in response to either of the electroresponsive means to bias said contacts open.

12. A circuit interrupter comprising, a plurality of pairs of separable contacts, electroresponsive means individual to each pair of contacts for effecting separation of said contacts in response to a predetermined current condition, additional electroresponsive means operable to effect separation of all of said pairs of contacts simultaneously in response to a different current condition, and effect reclosing following such separation, and counting means operable in response to closely consecutive operations of either the electroresponsive means individual to each pair of contacts or the additional electroresponsive means for maintaining said contacts separated after a predetermined number of such operations.

13. A polyphase circuit interrupter comprising, a plurality of pairs of separable contacts, electroresponsive means connected in series with each pair of contacts for individually effecting separation thereof in response to an overcurrent condition, additional electroresponsive means operable to simultaneously effect separation of the pairs of contacts, other electroresponsive means operable to reclose said pairs of contacts, and means operable in response to a ground fault current for effecting operation of the additional electroresponsive means, said ground fault current means being operable to effect operation of the other electroresponsive means when the ground fault current is interrupted.

References Cited in the file of this patent

UNITED STATES PATENTS

| | | |
|---|---|---|
| 2,329,043 | Goldsborough | Sept. 7, 1943 |
| 2,411,366 | Chubuck | Nov. 19, 1946 |
| 2,528,194 | Van Ryan | Oct. 31, 1950 |
| 2,545,987 | Blackburn | Mar. 20, 1951 |
| 2,567,411 | Van Ryan | Sept. 11, 1951 |
| 2,792,530 | Wallace | May 14, 1957 |